United States Patent Office 3,372,940
Patented Mar. 12, 1968

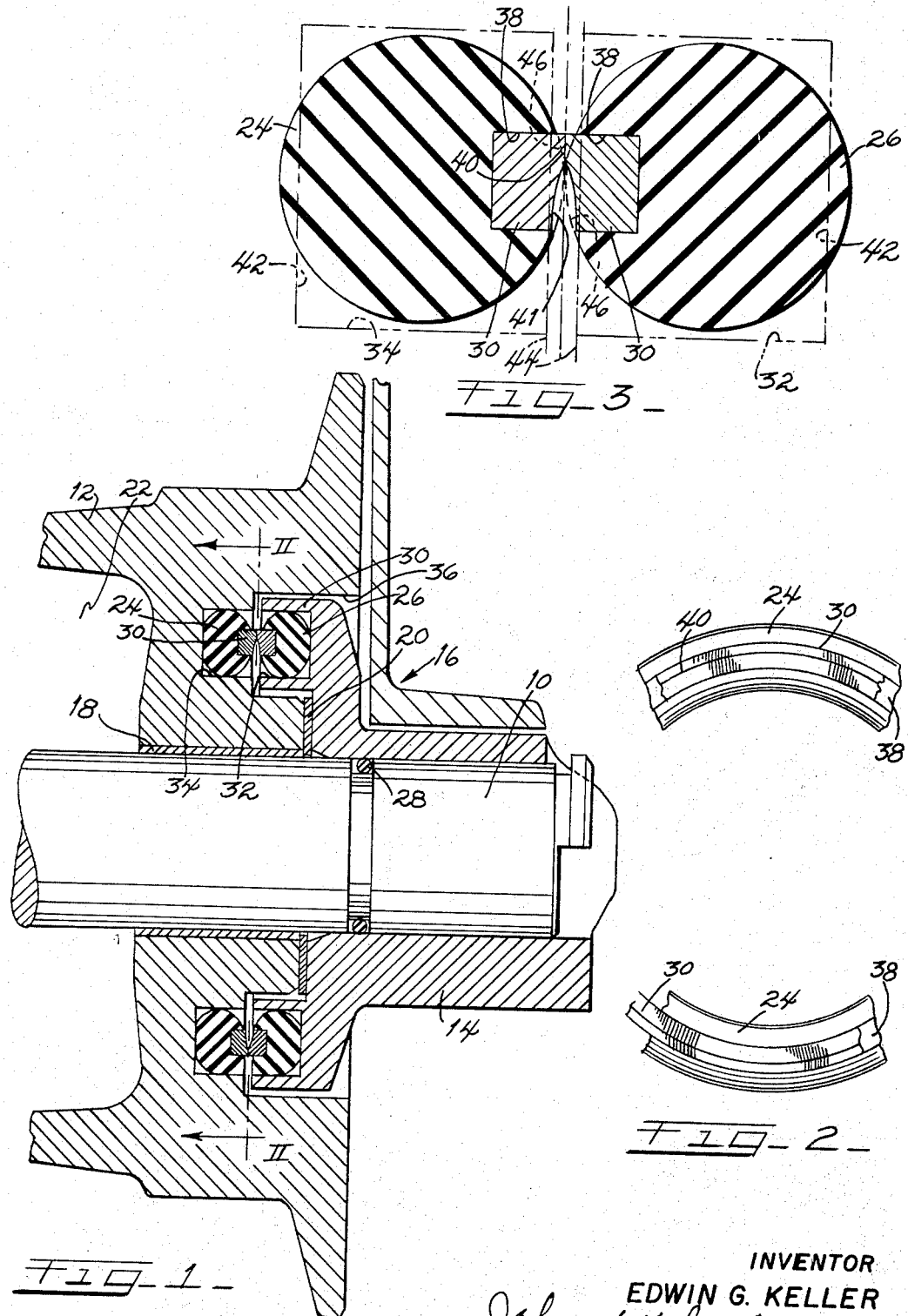

3,372,940
FACE SEAL
Edwin G. Keller, Mount Prospect, Ill., assignor to International Harvester Company, a corporation of Delaware
Filed July 15, 1965, Ser. No. 472,121
10 Claims. (Cl. 277—92)

ABSTRACT OF THE DISCLOSURE

Symmetrical face seal composed of double O-rings, each presenting a hard-faced, self-contained metal insert establishing an interface of sealing contact with the insert of the other one of the O-rings, and together establishing a friction drive forcing the seal halves to slide at the common interface and transmitted thereto from two, relatively rotatable host members containing the seal.

---

This application relates to a face seal for retaining lubricant within, and excluding foreign matter from, a sealed bearing. More specifically, sealing is accomplished by a pair of relatively rotating surfaces of the seal, each made of a hard material and engaged face to face with the other surface in a narrow ring of pressure contact.

Many seals according to the practice employ flat lapped surfaces engaged in an area of face to face contact, and one thought has been to multiply the area in order to multiply the seal life. Therefore, it is sometimes the practice to ultilize an annular sealing band between seal parts which is comparatively wide so as to provide considerable seal wear area. However, the disadvantage arises that the wide bands produce wear problems of their own when hard materials are used, and also when softer materials are used. Moreover, a suitable hard material is usually expensive, and the large seal part that is required entails a considerable cost disadvantage if that part is to be made a homogeneous one of hard material.

The present invention substantially eliminates the foregoing disadvantages, employing basically a durable, double O-ring construction of which the soft parts are economical to replace if necessary and the hard, rubbing parts are minimal in size and therefore comparatively economical in original cost. The double O-ring structure is applied, as herein shown, to seal the track roller of a track laying tractor, in a manner greatly simplifying the construction as will now be explained.

Various features, objects, and advantages are either specifically pointed out or will become apparent when, for a better understanding of the invention, reference is made to the accompanying drawing which shows a preferred embodiment thereof and in which:

FIGURE 1 is a sectional view in front elevation of a portion of a track roller embodying the present invention;

FIGURE 2 is a face view of one of the seal elements in the roller as seen in the plane of the section lines II—II FIGURE 1; and FIGURE 3 is a cross sectional view of both elements of the present double O-ring seal structure in relaxed state.

More particularly in the drawing, a track roller shaft 10 has a key connection affixing it fast to a track laying vehicle not shown, and the shaft rotatably supports a free turning track roller 12. The connection supporting the track roller shaft 10 includes a track roller shaft bracket 14 which is rigidly bolted to parts of the associated track frame generally indicated at 16.

The bracket 14 and the shaft 10, which are stationary, are engaged respectively by a thrust bearing 20 on which the roller rides and by a sleeve bearing 18 on which the roller 12 rides. The roller 12 is hollow so as to define a lubricant chamber 22 therein. The roller is of the crawler vehicle type generally as shown in U.S. Patent No. 3,167,321.

Lubricant from the chamber 22 lubricates the sleeve and thrust bearings 18 and 20, and also a set of double O-rings 24 and 26 which prevent escape of the lubricant between the roller 12 and the bracket 14. An O-ring 28 fitting in an annular groove around the track roller shaft 10 prevents escape of the lubricant between the shaft and the bore of the bracket in which the shaft is non-rotatably held.

The bracket 14 carries an axially extending circumferential flange 30. Respective annular grooves 32 and 34 formed in the face of the flange 30 and in a confronting portion of the roller 12 define a toric cavity of generally rectangular cross section in which the double O-rings are confined. The flange 30 itself fits with loose running clearance within an annular roller recess 36 which is axially relieved in the floor thereof by means of the groove 34.

The seals 24 and 26, on their adjacent sides, are each formed with a generally rectangular groove 38 receiving an insert ring 30 made of metal having a hard, extremely smooth, wear surface 40.

The surfaces 40 have first a flat grind to a dimensional size, and are then reduced to a narrow outer band of contact about 5/64" wide by relieving each of the inner surface portions with a spherical grind providing a concavely outwardly tapering gap 41. The residual coextensive surface of each ring 30 with the other ring 30 is, prior to assembly, lapped to a smoothness from about two and one half to three light bands. The resulting interface of contact is too nearly a perfect seal to leak lubricant outwardly from the gap 41 but, when the roller 12 rotates, the sealing surfaces 40 weep sufficient lubricant to stay well lubricated. The O-ring and the surface 40 are coaxial in each seal and have the same radius, so as to be precisely axially aligned.

In one physically constructed embodiment of the invention, the grooved O-rings 24 and 26 were made as separate parts and each of the metal inserts 30 was made as a separate part. Then the respective O-rings and metal inserts were paired and assembled together, with the groove 38 in each O-ring frictionally retaining the insert ring. In this way, the softer elastomeric material which makes up the body of the O-ring 24 can be replaced when it wears out, or otherwise takes a permanent set, merely by discarding it and replacing it with another O-ring with which the original metal insert ring 30 can be reassembled for further service. In connection with servicing, it is probably the best practice to replace the O-rings during each major overhaul whereas the metal insert rings 30 wear indefinitely and can continue to be reused.

If an actual rubber to metal bond is desired, the metal insert ring 30 can be molded in the O-ring at the time of molding the latter, and in that case a mold pressure of approximately 3,000 lbs. per square inch is found satisfactory. The heat applied and the curing time are a matter of trial, and the result is an integral insert and O-ring structure.

The material for the O-rings 24 and 26, which face together so as to be symmetrically identical, is preferably silicone and/or Buna-N synthetic rubber, compounded so that slight swelling of the material is manifest in the presence of the roller lubricant contemplated, for example, SAE 30 lubricant. A polyacrylic synthetic resin is also satisfactory as a material of which the O-rings 24 and 26 are made. A durometer hardness within the range from about 35 to about 50 is satisfactory, and the preferred durometer hardness reading is 40.

The insert rings 30 do not require a hardness coating if they are a Stellite-type alloy, which is an especially hard metal of the so-called non-ferrous type with excellent wear resistance characteristics. Except for the following one example, no further details appear here, and reference is made instead to the general discussion of Stellite appearing in volume 62, United States Patent Quarterly, pages 340 et seq. and pages 347 et seq. One satisfactory stellite-type alloy known as Stellite No. 93 has a composition as follows:

|  | Percent |
|---|---|
| Iron | 55 |
| Chromium | 17 |
| Cobalt | 6¼ |
| Carbon | 3 |
| Molybdenum | 16 |
| Vanadium | 2 |
| Balance | ¾ |

The material is cast normally with a 60 Rockwell C hardness, but a C hardness of 66 is attainable if the material as cast is then heat treated.

If a softer, less expensive alloy is used in forming the insert rings, for example, when forming the rings 30 of an aluminum alloy, the surface 40 is then flame plated to the right hardness with a bonded coating such as tungsten carbide on the aluminum base. In any case, the surface is lapped flat to the light band range indicated.

In the relaxed state of the O-rings 24 and 26 as illustrated in FIGURE 3, it can be seen that the front to rear thickness of each O-ring exceeds the axial dimension of the part of the toric cavity in which it fits by a perceptible amount, being about 6% in excess of the axial extent of the cavity. In the proportions shown, approximately 0.055 inch preset on a ring results when the roller 12 and the bracket 14 are forced together, thus crowding the material of each O-ring between the insert ring 30 carried thereby and the bottom of the adjacent end of the toric cavity, and between the confronting inner and outer walls of the toric cavity.

The walls at the respective adjacent ends of the cavity are indicated by broken lines at 42 in FIGURE 3. Each O-ring in cross section conforms generally to its reference circle indicated by the broken lines 46. The groove 38 is considerably offset from the solid core of the O-ring, leaving the core intact for solidly backing the insert ring.

During assembly, the mutually approaching cavity end walls 42 crowd the intervening material of the O-rings, causing it to flow into the inner and outer corners of the cavity and causing the side walls of the grooves 38 to tightly grip the metal insert rings. The final position of assembly is shown in FIGURE 1. The multiplied outside area of the deformed elastomeric material forming the O-rings presses against and tightly grips the walls of the toric cavity.

The O-rings and insert rings cooperate in simplified manner to accomplish four important functions. First, a very effective static seal results. Second, an appreciable preset or preload on the O-rings remains so as to take up any axial play that develops from wear or misalignment in the bearings of the roller. Third, the O-ring material transmits the torque solidly from the associated roller or bracket member as appropriate, so as to hold the adjacent insert ring nonrotatable relative thereto. Fourth, the crowding of the material of the O-ring insures a self-centering action of each associated insert 30 to prevent it from moving out of concentricity with the other insert.

From the foregoing, it will be appreciated that a very economical seal assembly is provided, affording a narrow ring of precision pressure contact. As viewed in cross-section the insert rings occupy no more than approximately 12% of the cross-sectional area of the total O-ring and insert area combined. The major portion of the insert ring 30 is embedded within the body of the O-ring, i.e., is flush with the associated one of the spaced apart planes indicated 44, FIGURE 3, so that no more than about 20% of the insert material projects from the O-ring past such plane. Assembly of each insert with its O-ring 24 is a simple matter; thereafter, face to face assembly of the double O-ring structure is a simple matter because the parts are identical and require merely a light coat of oil on their metal surfaces whereupon two such O-ring assemblies are brought together with their adjacent metal sides in contact. Fundamentally, the O-ring structure is perhaps the least complicated seal form and the present construction retains O-ring simplicity.

Each O-ring as viewed in cross section has a reference circle of generation indicated in broken lines at 46. So much of the ring 30 falls within the associated reference circle that it can be said, for all practical purposes, that the material of the metal ring is all inside of the reference circle of the associated O-ring.

In service, the coextensive contact of each ring 30 with the other ring gradually shifts radially inwardly with wear, but the characteristic of a narrow contact band tends to be retained. In other words, wear introduces a radially inwardly tapering gap at the extreme outer portions of the surfaces 40 and at the same time causes the gap 41 to reduce in thickness. The increasing or growing radial length of the outer gap is compensated for by reduction in the inner gap.

What is claimed is:

1. Sealing structure comprising:
   two confronting members to be sealed, mutually defining a toric cavity of generally rectangular cross-section, said cavity being formed by generally cylindrical inner and outer walls and an end wall on each of said members; and
   a pair of O-rings adjacent in side by side relation to one another in said cavity, said O-rings each being made of elastomeric material and conforming generally to a reference circle as viewed in cross-section;
   said O-rings each having, on their adjacent side, a hard-surface metal insert which establishes an interface of sealing contact with the insert of the adjacent O-ring, and which for the major portion of its cross-section is inside of the reference circle of the associated O-ring;
   the cross-sectional diameter of each O-ring in the relaxed position being slightly less than the radial extent of the surrounding toric cavity, affording clearance for self-centering of each O-ring and a crowding of said elastomeric material thereof against the adjacent end wall in the base of the cavity, and
   said material being distortively compressed into a portion of the adjacent end of the toric cavity to supply a friction driving face loading force to the interface of contact between the inserts and simultaneously frictionally interlock each O-ring and its respective cavity wall.

2. Sealing structure comprising:
   two confronting members to be sealed, mutually defining a toric cavity of generally rectangular cross-section, said cavity being formed by generally cylindrical inner and outer walls and an end wall on each of said members; and
   a pair of identical O-rings symmetrically arranged side by side in said cavity, said O-rings each being made of elastomeric material and conforming generally to a reference circle as viewed in cross-section;
   said O-rings each having, on their adjacent side, a hard surfaced metal insert which establishes an interface of sealing contact with the insert of the other O-ring, and which for the major portion of its cross-section is inside of the reference circle of the associated O-ring;
   the cross-sectional diameter of each O-ring in the relaxed position being slightly less than the radial extent of the surrounding toric cavity, affording clearance for self-centering of each O-ring and a crowding of said elastomeric material thereof against the adjacent end wall in the base of the cavity, and said material being distortively compressed into a portion of the adjacent end volume of the toric cavity to supply a friction driving, face loading force to the interface of contact between the inserts and simultaneously frictionally interlock each O-ring and its respective cavity wall.

3. The invention of claim 2 wherein:
the sum of the cross-sectional diameters of the two O-rings in relaxed position exceeds the axial extent of the toric cavity by at least approximately 6%.

4. The invention of claim 2 wherein:
said inserts are generally rectangular as viewed in cross-section.

5. The invention of claim 4 wherein:
said inserts within the O-ring structure occupy no more than approximately 12% of the cross-sectional area of the total O-ring structure.

6. The invention of claim 2 wherein:
the metal inserts engage one another in a narrow ring of pressure contact, each insert and the associated O-ring being formed as separate parts and assembled together in friction fit by a ring and groove connection.

7. The invention of claim 2, wherein:
each metal insert engages the other in a narrow ring of pressure contact, each ring insert and its associated O-ring molded as a unit so as to be integrally bonded to one another.

8. The invention of claim 2 wherein:
each insert is a hard alloy which has homogeneity and a high wear resistant quality throughout.

9. The invention of claim 2 wherein:
each metal insert for its major portion is composed of a base metal which is flame plated, along its desired interface of contact with the other insert, with a hard wear resistant coating lapped to light band specifications of smooth finish.

10. Sealed means comprising:
a supported roller formed with an annular recess therein at one end;
supporting means therefor comprising a bracket having a circumferential flange extending axially into the annular recess formed in the roller;
there being annular grooves which are formed in the respective face of the bracket flange and in the floor of the roller recess, and which define a toric cavity of generally rectangular cross section; and double O-rings in the cavity disposed one in each groove; each ring having a solid core, a ring receiving groove in the side of the O-ring between its core and the other O-ring, and a metallic ring insert in the ring receiving groove presenting a hard, wear surface establishing a mutual ring of pressure contact with the other ring insert;

the O-rings being made of an elastomeric material of Durometer hardness in the range of approximately 35 to 50, and compounded to produce slight swelling of the material in the presence of a lubricant so as to increase the effective preset on the seal;

the hard wear surface of each insert having a hardness reading of at least approximately 60 and a smoothness of at least approximately 2½ to 3 light bands flat;

each insert being substantially offset from the solid core of the O-ring but embedded in the material of the O-ring sufficiently that no more than approximately 20% of the volume of the insert metal projects from the O-ring;

the cross-sectional diameter of each O-ring in the relaxed position being slightly less than the radial extent of the surrounding toric cavity, affording clearance for self-centering of each O-ring and a crowding of the material thereof against the adjacent end wall in the base of the cavity, and between the insert and each of the confronting inner and outer walls of the toric cavity;

said material being distortively compressed into no more than a major portion of the adjacent end of the toric cavity to supply a friction driving face loading force to said mutual ring of pressure contact between the inserts and simultaneously frictionally interlock said metal inserts, O-rings, and cavity walls.

References Cited

UNITED STATES PATENTS

| 1,918,685 | 7/1933 | Brill et al. | 277—234 X |
| 3,195,900 | 7/1965 | Schoenrock | 277—92 X |
| 3,244,457 | 4/1966 | Ross | 277—92 X |

FOREIGN PATENTS

| 728,452 | 4/1932 | France. |
| 1,326,010 | 3/1963 | France. |
| 1,114,104 | 9/1961 | Germany. |

LAVERNE D. GEIGER, *Primary Examiner.*

J. S. MEDNICK, *Assistant Examiner.*